(12) United States Patent
Satou et al.

(10) Patent No.: US 10,966,057 B2
(45) Date of Patent: Mar. 30, 2021

(54) POSITION IDENTIFYING DEVICE, POSITION IDENTIFYING SYSTEM, AND COMPUTER PROGRAM PRODUCT

(71) Applicant: FUJITSU CLIENT COMPUTING LIMITED, Kanagawa (JP)

(72) Inventors: Keita Satou, Kawasaki (JP); Akira Okamoto, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/785,991

(22) Filed: Feb. 10, 2020

(65) Prior Publication Data
US 2020/0296547 A1 Sep. 17, 2020

(30) Foreign Application Priority Data
Mar. 12, 2019 (JP) .............................. JP2019-044902

(51) Int. Cl.
*H04W 4/029* (2018.01)
*H04W 4/021* (2018.01)

(52) U.S. Cl.
CPC .......... *H04W 4/029* (2018.02); *H04W 4/021* (2013.01)

(58) Field of Classification Search
CPC .......... H04W 4/029; H04W 4/021; G01S 5/14
See application file for complete search history.

(56) References Cited

U.S. PATENT DOCUMENTS

| | | | |
|---|---|---|---|
| 2015/0177361 A1* | 6/2015 | Otomo | H04W 4/023 455/456.1 |
| 2017/0192085 A1* | 7/2017 | Wagner | G01S 5/10 |
| 2020/0209345 A1* | 7/2020 | Hwang | G01S 5/00 |

FOREIGN PATENT DOCUMENTS

JP 5975106 B2 8/2016

* cited by examiner

*Primary Examiner* — Minjung Kim
(74) *Attorney, Agent, or Firm* — Osha Bergman Watanabe & Burton LLP

(57) ABSTRACT

A position identifying device calculates a plurality of estimated lines with base points at the monitoring devices and with radii equal to estimated distances from the monitoring devices to the wireless communication device, based on a transmission signal of a wireless communication device in a target area acquired from each of monitoring devices disposed around the target area, and, when first intersections of a standard estimated line with a base point at a standard monitoring device, and reference estimated lines with base points at reference monitoring devices, are located farther from the standard monitoring device than a virtual standard line connecting two of the reference monitoring devices, identifies, as a position of the wireless communication device, an inside of a first area inside the first intersections and second intersections of the virtual standard line and the reference estimated lines.

7 Claims, 7 Drawing Sheets

POSITION IDENTIFYING DEVICE, POSITION IDENTIFYING SYSTEM, AND COMPUTER PROGRAM PRODUCT

CROSS-REFERENCE TO RELATED APPLICATIONS

This application is based upon and claims the benefit of priority from Japanese Patent Application No. 2019-044902, filed Mar. 12, 2019, the entire contents of which are incorporated herein by reference.

TECHNICAL FIELD

The present disclosure relates generally to a position identifying device, a position identifying system, and a computer program product.

BACKGROUND

Systems that identify the positions of wireless communication devices are known. For example, a system is known in which a signal transmitted from a wireless communication device is received by a radio station, and the position of the wireless communication device is identified using the signal.

Conventionally, the centroid of the intersections of a plurality of estimated lines indicating candidate positions of a wireless communication device is identified as the position of the wireless communication device. Unfortunately, in this conventional method, as the distance of the wireless communication device increases from the radio station serving as a reference for position identification, the range indicated by the intersections of estimated lines increases, and the position identifying accuracy decreases. In the conventional method, therefore, the accuracy in identifying the position of the wireless communication device is reduced in some cases.

SUMMARY

According to an aspect of the present invention, a position identifying device includes processing circuitry configured to implement an acquisition unit, a calculation unit, a determination unit, and an identifying unit. The acquisition unit is configured to acquire a transmission signal of a wireless communication device in a target area from each of at least three or more monitoring devices disposed around the target area. The calculation unit is configured to calculate a plurality of estimated lines with base points at the monitoring devices and with radii equal to estimated distances from the monitoring devices to the wireless communication device, based on the transmission signal. The determination unit is configured to determine whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device, the virtual standard line connecting two of the reference monitoring devices. The identifying unit is configured to, when it is determined that the first intersections are located farther from the standard monitoring device than the virtual standard line, identify, as a position of the wireless communication device, an inside of a first area inside the first intersections and second intersections of the virtual standard line and the reference estimated lines.

According to another aspect of the present invention, a position identifying system includes a position identifying device and a plurality of monitoring devices configured to communicate with the position identifying device. The position identifying device includes processing circuitry configured to implement an acquisition unit, a calculation unit, a determination unit, and an identifying unit. The acquisition unit is configured to acquire a transmission signal of a wireless communication device in a target area from each of at least three or more of the monitoring devices disposed around the target area. The calculation unit is configured to calculate a plurality of estimated lines with base points at the monitoring devices and with radii equal to estimated distances from the monitoring devices to the wireless communication device, based on the transmission signal. The determination unit is configured to determine whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device. The identifying unit is configured to, when it is determined that the first intersections are located farther from the standard monitoring device than the virtual standard line, identify, as a position of the wireless communication device, an inside of a first area inside the first intersections and second intersections of the virtual standard line and the reference estimated lines.

According to still another aspect of the present invention, a computer program product includes programmed instructions embodied in and stored on a non-transitory computer readable medium. The instructions, when executed by a computer, cause the computer to perform: acquiring a transmission signal of a wireless communication device in a target area from each of at least three or more monitoring devices disposed around the target area; calculating a plurality of estimated lines with base points at the monitoring devices and with radii equal to estimated distances from the monitoring devices to the wireless communication device, based on the transmission signal; determining whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device, the virtual standard line connecting two of the reference monitoring devices; and when it is determined that the first intersections are located farther from the standard monitoring device than the virtual standard line, identifying, as a position of the wireless communication device, an inside of a first area inside the first intersections and second intersections of the virtual standard line and the reference estimated lines.

DETAILED DESCRIPTION

Illustrative embodiments of the present disclosure will be described below. The configuration of embodiments illustrated below and the operation and effect achieved by the configuration are by way of example only. The embodiments below are not intended to limit the disclosed technique.

Figure 1:
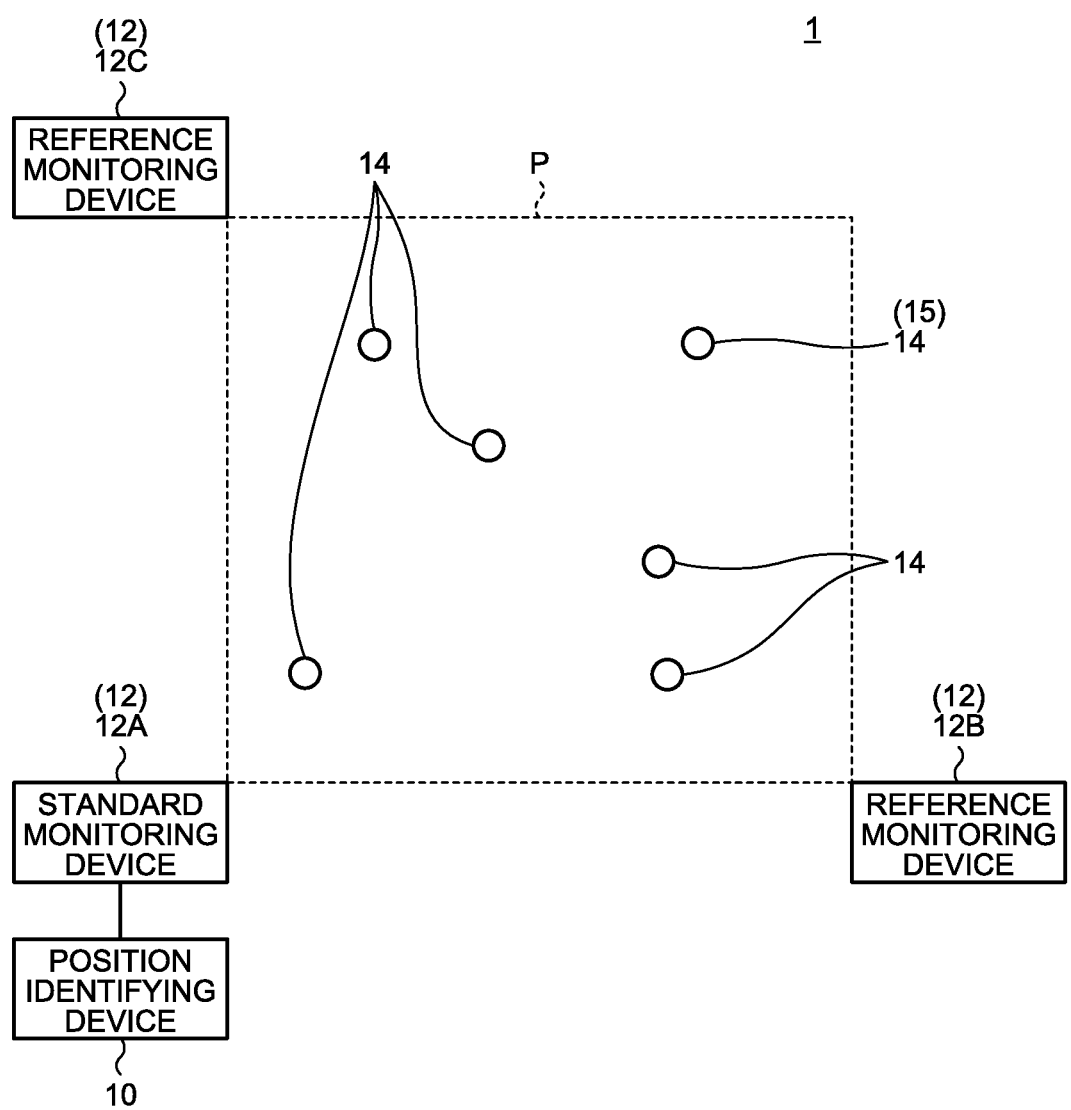
FIG. 1 is a diagram illustrating an example of a position identifying system according to an embodiment.

FIG. 1 is a diagram illustrating an example of a position identifying system 1 according to the present embodiment.

The position identifying system 1 includes a position identifying device 10, monitoring devices 12, and wireless communication devices 14. The position identifying device 10 is connected to the monitoring devices 12 to communicate with each other wirelessly or by wire.

The position identifying device 10 is a device that identifies the position of a wireless communication device 14 in a target area P.

The target area P may be any predetermined area. In the present embodiment, the target area P is a target area in which the monitoring devices 12 wirelessly communicate with the wireless communication devices 14. The shape and the size of the target area P are not limited. The target area P is, for example, an area in a predetermined range, such as a building, a space in a building, or a room.

The position identifying device 10 wirelessly communicates with a wireless communication device 14 through the monitoring devices 12. That is, in the present embodiment, communication between the position identifying device 10 and the wireless communication device 14 is performed through the monitoring devices 12.

Each monitoring device 12 transmits a variety of signals to a wireless communication device 14 in the target area P. The monitoring device 12 receives a transmission signal from a wireless communication device 14 in the target area P. That is, the monitoring device 12 functions as a transmitting station that transmits a signal to a wireless communication device 14 in the target area P and as a receiving station that receives a signal from a wireless communication device 14 in the target area P.

In the present embodiment, the position identifying system 1 includes three monitoring devices 12 as an example. However, as long as the position identifying system 1 includes at least three monitoring devices 12, the number of monitoring devices 12 is not particularly limited to three.

The monitoring devices 12 are arranged around the target area P. The positions and the wireless transmission/reception directions of the monitoring devices 12 are adjusted in advance so that the monitoring devices 12 can each transmit a signal within the target area P or receive a transmission signal from a wireless communication device 14 in the target area P. It is assumed that the positions of the monitoring devices 12 are fixed. It is also assumed that these monitoring devices 12 are arranged at positions different from each other. These monitoring devices 12 have the same function and the same configuration except that they are arranged at different positions.

In the present embodiment, one of the three monitoring devices 12 is referred to as a standard monitoring device (standard monitoring device 12A). The monitoring devices 12 other than the standard monitoring device 12A of the three monitoring devices 12 are referred to as reference monitoring devices (reference monitoring device 12B and reference monitoring device 12C). Which of the monitoring devices 12 serves as the standard monitoring device and which serves as the reference monitoring devices are set by the position identifying device 10 described later (the detail will be described later). The monitoring devices 12 (standard monitoring device 12A, reference monitoring device 12B, reference monitoring device 12C) are simply referred to as the monitoring devices 12 when they are collectively referred to.

The wireless communication device 14 is a wireless communication device movable in position. The wireless communication device 14 is, for example, carried or mounted on a target such as a user or an article to be movable in position. The wireless communication device 14 may be referred to as a tag.

The wireless communication device 14 is equipped with, for example, a function of communication via Bluetooth (registered trademark), and transmits and receives a transmission signal based on a wireless communication standard such as Bluetooth Low Energy (BLE). The wireless communication standard used by the wireless communication device 14 is not limited to Bluetooth. For example, the wireless communication device 14 may perform wireless communication using an infrared communication standard such as Infrared Data Association (IrDA).

The wireless communication device 14 may transmit a transmission signal directly to each of the monitoring devices 12 or may transmit a transmission signal to the monitoring device 12 via multi-hop wireless communication. When a wireless signal is sent to the monitoring device 12 via multi-hop wireless communication, the wireless communication device 14 transfers to the monitoring device 12 a transmission signal received from the wireless communication device 14 that originates the signal such that the transmission signal is relayed by one or more other wireless communication devices 14. The monitoring device 12 outputs the received transmission signal to the position identifying device 10.

In the present embodiment, the transmission signal refers to a signal including a wireless signal transmitted by the wireless communication device 14 that originates the signal.

The position identifying device 10 identifies the position of the wireless communication device 14 that originates the transmission signal, using the transmission signal of the wireless communication device 14 acquired from each of the monitoring devices 12 (the detail will be described later).

The functional configuration of the position identifying system 1 will now be described.

Figure 2:
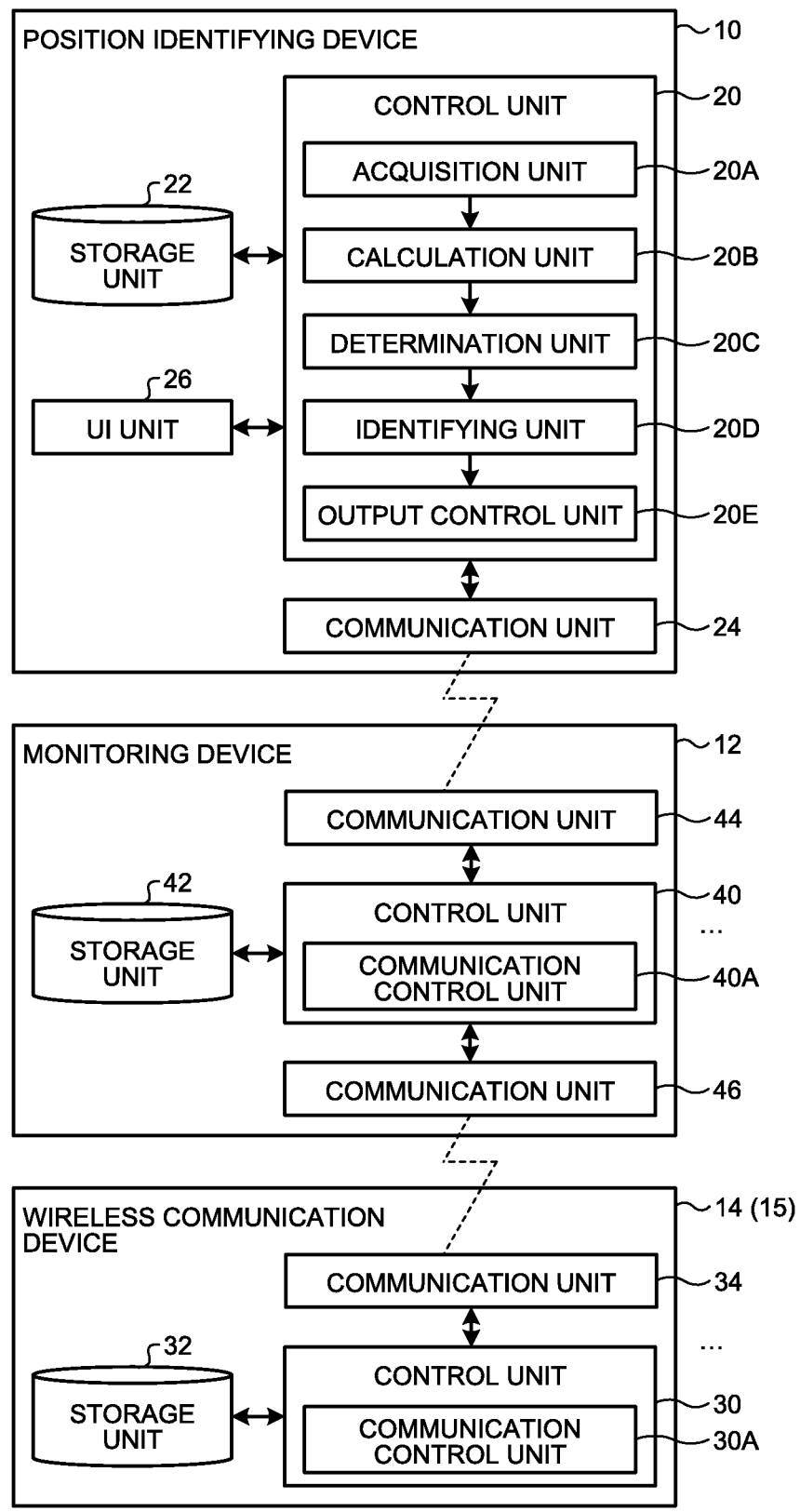
FIG. 2 is a functional block diagram of the position identifying system according to the embodiment.

FIG. 2 is an exemplary functional block diagram of the position identifying system 1.

The functions of the wireless communication device 14 will be first described.

The wireless communication device 14 includes a control unit 30, a storage unit 32, and a communication unit 34. The control unit 30 is connected with the storage unit 32 and the communication unit 34 such that data or signals can be exchanged.

The storage unit 32 stores a variety of information. The storage unit 32 is a known storage medium. The communication unit 34 is a communication interface for communicating with other devices. For example, the communication unit 34 is a communication interface for wirelessly communicating with at least one of the monitoring devices 12 and other wireless communication devices 14.

The control unit 30 includes a communication control unit 30A.

The communication control unit 30A is implemented by, for example, one or more processors. For example, the communication control unit 30A may be implemented by causing a processor such as a central processing unit (CPU) to execute a computer program, that is, by software. The communication control unit 30A may be implemented by a processor such as a dedicated integrated circuit (IC), that is, by hardware. The communication control unit 30A may be implemented by software and hardware in combination.

The communication control unit 30A communicates with other devices at a predetermined frequency of communication. Communication refers to both of reception of a variety of signals from another device (monitoring device 12) and transmission of a transmission signal to another device.

For example, the communication control unit 30A receives a signal transmitted from the monitoring device 12 at a predetermined frequency of communication. For example, the communication control unit 30A transmits a transmission signal including a specific wireless signal at the frequency of communication when a predetermined condition is satisfied.

For example, it is assumed that the communication control unit 30A sends a transmission signal to the monitoring device 12 via multi-hop wireless communication. It is also assumed that one wireless communication device 14 including the communication control unit 30A is the source of a wireless signal. In this case, the communication control unit 30A transmits to another wireless communication device 14 in the surroundings, via multi-hop wireless communication, a transmission signal including a wireless signal originating from the wireless communication device 14 equipped with the communication control unit 30A and hop count information indicating an initial value (for example, "1") of the number of hops from the source wireless communication device 14.

In this case, the other wireless communication device 14 in the surroundings increments the hop count information included in the received transmission signal by "1" and sends the transmission signal to another wireless communication device 14 via multi-hop wireless communication. Consequently, the transmission signal including hop count information indicating the number of hops from the wireless communication device 14 that originates the wireless signal is sent to each of the monitoring devices 12.

In the following description, the wireless communication device 14 that originates a wireless signal may be referred to as the source wireless communication device 15. The wireless communication devices 14 and the source wireless communication device 15 are simply referred to as the wireless communication devices 14 when they are collectively referred to.

When a wireless communication device 14 receives a transmission signal from another wireless communication device 14, the communication control unit 30A increments the hop count information included in the received transmission signal by "1" and sends the transmission signal to another wireless communication device 14 via multi-hop wireless communication.

The wireless communication devices 14 are not limited to the embodiment as described above in which a transmission signal is sent to the monitoring device 12 via multi-hop wireless communication. More specifically, the source wireless communication device 15 may wirelessly communicate a transmission signal directly to each of the monitoring devices 12, not through other wireless communication devices 14. In this case, the transmission signal may have a data configuration that does not include hop count information.

The functions of the monitoring devices 12 will now be described.

The monitoring devices 12 each include a control unit 40, a storage unit 42, a communication unit 44, and a communication unit 46. The storage unit 42, the communication unit 44, and the communication unit 46 are connected with the control unit 40 such that data or signals can be exchanged.

The storage unit 42 stores a variety of information. The storage unit 42 is a known storage medium. In the present embodiment, the storage unit 42 stores identification information of the monitoring device 12 and position information indicating the installation position of the monitoring device 12 in advance.

The identification information of the monitoring device 12 is information for uniquely identifying the monitoring device 12. In the following description, the identification information of the monitoring device 12 may be referred to as monitoring device ID.

The position information of the monitoring device 12 may be represented by absolute coordinates or may be represented by relative coordinates indicating the position relative to another monitoring device 12. In the present embodiment, the position information of the monitoring device 12 is represented by relative coordinates where one specific monitoring device 12 is the origin, as an example.

The communication unit 44 is a communication interface for communicating with the position identifying device 10 wirelessly or by wire. In the present embodiment, the communication unit 44 of the monitoring device 12 communicates with the position identifying device 10 wirelessly, as an example. However, the communication unit 44 of the monitoring device 12 may communicate with the position identifying device 10 by wire.

The communication unit 46 is a communication interface for wirelessly communicating with each of one or more wireless communication devices 14 in the target area P.

The control unit 40 includes a communication control unit 40A.

The communication control unit 40A is implemented by, for example, one or more processors. For example, the communication control unit 40A may be implemented by causing a processor such as a CPU to execute a computer program, that is, by software. The communication control unit 40A may be implemented by a processor such as a dedicated IC, that is, by hardware. The communication control unit 40A may be implemented by software and hardware in combination.

The communication control unit 40A wirelessly communicates with other devices at a predetermined frequency of communication. In the present embodiment, the communication control unit 40A wirelessly communicates with a wireless communication device 14 in the target area P and receives a transmission signal from the wireless communication device 14.

Upon receiving a transmission signal, the communication control unit 40A sends the transmission signal, and the monitoring device ID of the monitoring device 12 and the position information of the monitoring device 12 stored in the storage unit 42, to the position identifying device 10 through the communication unit 44.

The transmission signal transmitted from the source wireless communication device 15 is thus received by each of the monitoring devices 12 directly or through other wireless communication devices 14 and sent from each of the monitoring devices 12 to the position identifying device 10.

The functions of the position identifying device 10 will now be described.

The position identifying device 10 includes a control unit 20, a storage unit 22, a communication unit 24, and a user interface (UI) unit 26. The storage unit 22, the communication unit 24, and the UI unit 26 are connected with the control unit 20 such that data or signals can be exchanged.

The storage unit 22 stores a variety of information. The storage unit 22 is a known storage medium such as a hard disk drive (HDD). The storage unit 22 may be provided in an external device.

The communication unit 24 is a communication interface for communicating with the monitoring device 12.

The UI unit 26 includes an input function for accepting an operation instruction from a user and a display function for displaying an image. The input function is, for example, a keyboard, a mouse, or the like. The display function is, for example, a liquid crystal display or an organic electroluminescent (EL) display. The UI unit 26 may be a touch panel having the integrated input function and display function.

The control unit 20 includes an acquisition unit 20A, a calculation unit 20B, a determination unit 20C, an identifying unit 20D, and an output control unit 20E.

The units above are implemented, for example, by one or more processors. For example, the units above may be implemented by causing a processor such as a CPU to execute a computer program, that is, by software. The units may be implemented by a processor such as a dedicated IC, that is, by hardware. The units may be implemented by software and hardware in combination. When a plurality of processors are used, each processor may implement one of the units or may implement two or more of the units.

The acquisition unit 20A acquires a transmission signal of a wireless communication device 14 in the target area P from each of at least a plurality of the monitoring devices 12 (standard monitoring device 12A, reference monitoring device 12B, reference monitoring device 12C) arranged around the target area P.

Specifically, the acquisition unit 20A acquires a transmission signal transmitted from the source wireless communication device 15, which is one of the wireless communication devices 14 in the target area P and is the wireless communication device 14 originating the transmission signal, from each of the monitoring devices 12.

The calculation unit 20B calculates a plurality of estimated lines, the base points of which are at the monitoring devices 12 and the radii of which are the estimated distances from the monitoring devices 12 to the source wireless communication device 15, based on the transmission signal.

Figure 3:
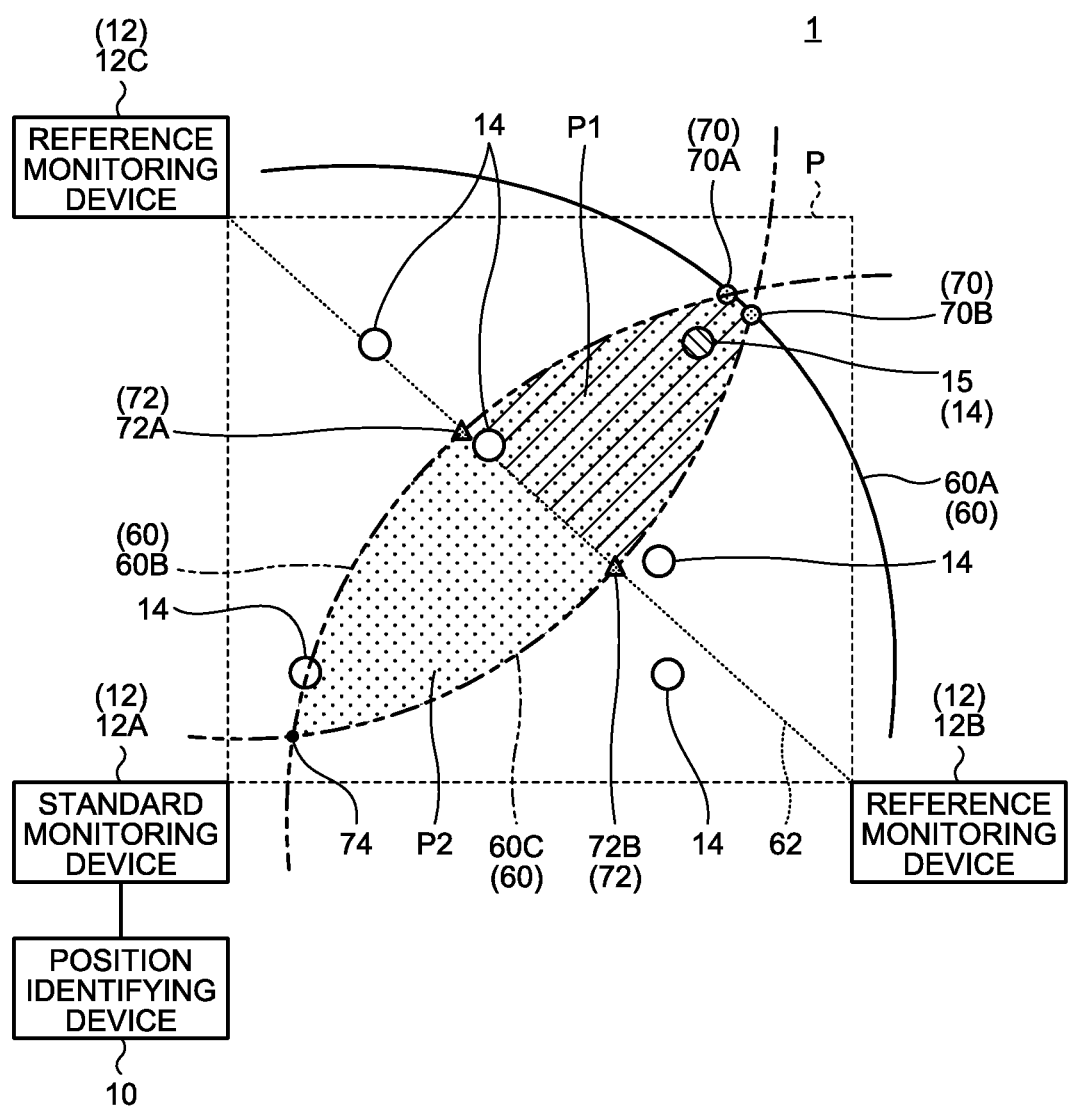
FIG. 3 is a diagram illustrating position identification of a wireless communication device according to the embodiment.

A description is given with reference to FIG. 3. FIG. 3 is a diagram illustrating position identification of the source wireless communication device 15 by the control unit 20.

First, the calculation unit 20B sets each of the monitoring devices 12 as a base point and calculates the estimated distance from each of the monitoring devices 12 to the source wireless communication device 15.

For example, it is assumed that the source wireless communication device 15 sends a transmission signal to the monitoring device 12 through the other wireless communication devices 14 via multi-hop wireless communication. In this case, the position identifying device 10 receives the transmission signal including hop count information from each of the monitoring devices 12. The hop count information is information indicating the number of hops taken until the wireless signal transmitted from the source wireless communication device 15 is received by the monitoring device 12 via multi-hop wireless communication.

In this case, the calculation unit 20B calculates the estimated distance from each of the monitoring devices 12 to the source wireless communication device 15, based on the hop count information included in the transmission signal and the distance between the wireless communication devices 14.

The calculation unit 20B can calculate the distance between the wireless communication devices 14 by a known method.

For example, the calculation unit 20B calculates the average distance between the wireless communication devices 14, based on the density of the wireless communication devices 14 in the target area P. The density of the wireless communication devices 14 in the target area P can be derived, for example, by known image processing. The calculation unit 20B then uses the calculated average distance as the distance between the wireless communication devices 14.

Alternatively, the calculation unit 20B acquires the distance reached by radio waves of the transmission signal sent by each of the wireless communication devices 14. The distance reached by radio waves may be stored in the storage unit 22 in advance. The distance between the wireless communication devices 14 may be calculated by a known method using the distance reached by radio waves.

The calculation unit 20B can determine the result of multiplication of the number of hops indicated by the hop count information and the distance between the wireless communication devices 14 as the estimated distance from the wireless communication device 14 to the source wireless communication device 15.

As described above, the source wireless communication device 15 may transmit a source signal to each of the monitoring devices 12 directly without through the other wireless communication devices 14. In this case, the calculation unit 20B accepts a transmission signal including a received signal strength indication (RSSI) of radio waves received from the source wireless communication device 15, from the monitoring device 12.

In this case, the calculation unit 20B can calculate the estimated distances from the monitoring devices 12 to the source wireless communication device 15, from the RSSI of radio waves included in the transmission signals accepted from the monitoring devices 12, using a known method.

In this way, the calculation unit 20B calculates the estimated distance from the monitoring device 12 to the source wireless communication device 15, using the transmission signal acquired from the monitoring device 12, for each of the monitoring devices 12.

The calculation unit 20B then calculates a plurality of estimated lines 60, the base points of which are at the monitoring devices 12 and the radii of which are the estimated distances from the monitoring devices 12 to the source wireless communication device 15.

As illustrated in FIG. 3, it is assumed that the source wireless communication device 15 of the wireless communication devices 14 is the wireless communication device 14 that originates the transmission signal. In this case, the calculation unit 20B calculates the estimated lines 60, the base points of which are at the monitoring devices 12.

The calculation unit 20B can identify the position serving as a base point of each of the monitoring devices 12, using the monitoring device ID received together with the transmission signal from the monitoring device 12 and the position information of the monitoring device 12. Then, the calculation unit 20B can calculate an arc, the center of which is the position serving as the base point and the radius of which is the estimated distance calculated for each of the monitoring devices 12, as the estimated line 60.

In the present embodiment, the position identifying device 10 acquires the monitoring device ID of the monitoring device 12 and the position information of the monitoring device 12, together with the transmission signal of the source wireless communication device 15, from each of the monitoring devices 12, as an example. The position identifying device 10, however, may acquire the transmission signal of the source wireless communication device 15 and the monitoring device ID of the monitoring device 12 from each of the monitoring devices 12. In this case, the position identifying device 10 stores the monitoring device ID and the position information of the monitoring device 12 associated with each other in advance in the storage unit 22. The calculation unit 20B then reads the position information of the monitoring device 12 corresponding to the monitoring device ID received together with the transmission signal from the storage unit 22 and uses the read position information for calculation of the estimated line 60.

The determination unit 20C presets one of the monitoring devices 12 as a standard monitoring device. The determination unit 20C presets a monitoring device 12 other than the standard monitoring device of the monitoring devices 12, as a reference monitoring device. In the present embodiment, the determination unit 20C presets one of the monitoring devices 12 as a standard monitoring device 12A, and the other monitoring devices 12 as a reference monitoring device 12B and a reference monitoring device 12C, as an example.

The determination unit 20C identifies an estimated line 60, the base point of which is at the standard monitoring device 12A, as a standard estimated line (standard estimated line 60A), from among the estimated lines 60, the base points of which are at the monitoring devices 12. The determination unit 20C identifies the estimated lines 60, the base points of which are at the reference monitoring device 12B and the reference monitoring device 12C, as reference estimated lines (reference estimated line 60B, reference estimated line 60C), from among the estimated lines 60.

Then, the determination unit 20C determines whether first intersections 70 of the standard estimated line 60A with the reference estimated line 60B and the reference estimated line 60C are located farther from the standard monitoring device 12A than a virtual standard line 62.

In the state illustrated in FIG. 3, the determination unit 20C identifies a first intersection 70A of the standard estimated line 60A and the reference estimated line 60B and a first intersection 70B of the standard estimated line 60A and the reference estimated line 60C, as the first intersections 70.

Specifically, for example, when the estimated distance from the monitoring device 12 to the source wireless communication device 15 is "r", the distance between the wireless communication devices 14 (that is, the distance of one hop) is "d", and the number of hops indicated by the hop information acquired by the monitoring device 12 is "n", the estimated distance "r" is expressed by Equation (1) below.

$$r = d \times n \quad (1)$$

The standard estimated line 60A, the reference estimated line 60B, and the reference estimated line 60C obtained by deriving the estimated distances from the standard monitoring device 12A, the reference monitoring device 12B, and the reference monitoring device 12C to the source wireless communication device 15 using Equation (1) above are expressed by Equations (2) to (4) below.

$$x^2 + (y - y_0)^2 = r_0^2 \quad (2)$$

$$x^2 + y^2 = r_1^2 \quad (3)$$

$$(x - x_2)^2 + y^2 = r_2^2 \quad (4)$$

Equation (2) to Equation (4) express the estimated lines 60, where the position coordinates of the standard monitoring device 12A are the origin $(x, y) = (0, 0)$, the position coordinates of the reference monitoring device 12C are $(x, y) = (0, y_0)$, and the position coordinates of the reference monitoring device 12B are $(x, y) = (x_2, 0)$. In Equation (2) to Equation (4) above, $r_0$ is the estimated distance from the reference monitoring device 12C to the source wireless communication device 15, $r_1$ is the estimated distance from the standard monitoring device 12A to the source wireless communication device 15, and $r_2$ is the estimated distance from the reference monitoring device 12B to the source wireless communication device 15.

Then, the position coordinates $(x_\alpha, y_\alpha)$ of the first intersection 70B are calculated by the solution to a system of Equation (2) and Equation (3). The position coordinates $(x_\beta, y_\beta)$ of the first intersection 70A are calculated by the solution to a system of Equation (3) and Equation (4). The position coordinates $(x_\gamma, y_\gamma)$ of a third intersection 74 are calculated by the solution to a system of Equation (2) and Equation (4).

The determination unit 20C therefore identifies the first intersection 70A of the standard estimated line 60A and the reference estimated line 60B and the first intersection 70B of the standard estimated line 60A and the reference estimated line 60C by calculating Equation (2) to Equation (4) above.

The determination unit 20C identifies the virtual standard line 62.

The virtual standard line 62 is a straight line connecting the reference monitoring device 12B with the reference monitoring device 12C. Specifically, the virtual standard line 62 is a straight line connecting the positions of the reference monitoring device 12B and the reference monitoring device 12C that are the monitoring devices 12 other than the standard monitoring device 12A of a plurality of the monitoring devices 12. The determination unit 20C can use the position information of the reference monitoring device 12B and the position information of the reference monitoring device 12C, received from the reference monitoring device 12B and the reference monitoring device 12C together with the transmission signal, to generate the virtual standard line 62 connecting the positions indicated by these pieces of position information.

For example, as described above, it is assumed that the position coordinates of the standard monitoring device 12A are the origin $(x, y) = (0, 0)$, the position coordinates of the reference monitoring device 12C are $(x, y) = (0, y_0)$, and the position coordinates of the reference monitoring device 12B are $(x, y) = (x_2, 0)$.

In this case, the virtual standard line 62 is expressed by Equation (5) below.

$$y = (-y_0 \times x)/x_2 + y_0 \quad (5)$$

The determination unit 20C then determines whether both of the first intersection 70A and the first intersection 70B as the first intersections 70 are located farther from the standard monitoring device 12A than the virtual standard line 62.

Specifically, when the first intersection 70A satisfies Equation (6) below and the first intersection 70B satisfies Equation (7) below, the determination unit 20C determines that both of the first intersection 70A and the first intersection 70B as the first intersections 70 are located farther from the standard monitoring device 12A than the virtual standard line 62.

$$(-y_0 \times x_\alpha)/x_2 + y_0 > y_\alpha \quad (6)$$

$$(-y_0 \times x_\beta)/x_2 + y_0 > y_\beta \quad (7)$$

In the state illustrated in FIG. 3, the determination unit 20C determines that both of the first intersection 70A and the first intersection 70B are located farther from the standard monitoring device 12A than the virtual standard line 62.

When it is determined that the first intersections 70 (first intersection 70A, first intersection 70B) are located farther from the standard monitoring device 12A than the virtual standard line 62, the identifying unit 20D identifies the inside of a first area P1 inside the first intersections 70 (first intersection 70A, first intersection 70B) and second intersections 72, as the position of the source wireless communication device 15.

The second intersections 72 are the intersections of the virtual standard line 62 with the reference estimated line 60B and the reference estimated line 60C. In the example illustrated in FIG. 3, the identifying unit 20D identifies a second intersection 72A of the virtual standard line 62 and the reference estimated line 60B and a second intersection 72B of the virtual standard line 62 and the reference estimated line 60C.

Specifically, the identifying unit 20D can calculate the position coordinates ($x_{\alpha'}$, $y_{\alpha'}$) of the second intersection 72B of the virtual standard line 62 and the reference estimated line 60C by the solution to a system of Equation (2) above and Equation (5) above. The identifying unit 20D can calculate the position coordinates ($x_{\beta'}$, $y_{\beta'}$) of the second intersection 72A of the virtual standard line 62 and the reference estimated line 60B by the solution to a system of Equation (4) above and Equation (5) above.

The identifying unit 20D identifies the inside of the first area P1 inside the first intersection 70A, the first intersection 70B, the second intersection 72A, and the second intersection 72B, as the position of the source wireless communication device 15.

Specifically, the identifying unit 20D identifies the inside of the first area P1 encompassed by an arc between the first intersection 70A and the first intersection 70B on the standard estimated line 60A, an arc between the first intersection 70A and the second intersection 72A on the reference estimated line 60B, a straight line between the second intersection 72A and the second intersection 72B on the virtual standard line 62, and an arc between the second intersection 72B and the first intersection 70B on the reference estimated line 60C, as the position of the source wireless communication device 15.

The identifying unit 20D may further identify the centroid position of the first intersections 70 (first intersection 70A, first intersection 70B) and the second intersections 72 (second intersection 72A, second intersection 72B) in the first area P1, as the position of the source wireless communication device 15. The centroid position can be calculated using a known method.

On the other hand, the identifying unit 20D may determine that the first intersections 70 (first intersection 70A, first intersection 70B) are located closer to the standard monitoring device 12A than the virtual standard line 62.

Specifically, when at least one of Equation (6) above and Equation (7) above is not satisfied, the determination unit 20C determines that the first intersections 70 (first intersection 70A, first intersection 70B) are located closer to the standard monitoring device 12A than the virtual standard line 62.

In this case, the identifying unit 20D identifies the inside of a second area P2 inside the first intersections 70 (first intersection 70A, first intersection 70B) and the third intersection 74, as the position of the source wireless communication device 15.

The third intersection 74 is an intersection closer to the standard monitoring device 12A, of the intersections of the reference estimated line 60B and the reference estimated line 60C.

More specifically, in this case, the identifying unit 20D identifies the inside of the second area P2 encompassed by an arc between the third intersection 74 and the first intersection 70A on the reference estimated line 60B, an arc between the first intersection 70A and the first intersection 70B on the standard estimated line 60A, and an arc between the first intersection 70B and the third intersection 74 on the reference estimated line 60C, as the position of the source wireless communication device 15.

In this case, the identifying unit 20D identifies the centroid position of the first intersection 70A, the first intersection 70B, and the third intersection 74 in the second area P2, as the position of the source wireless communication device 15.

The output control unit 20E outputs the result of position identification of the source wireless communication device 15 by the identifying unit 20D to the UI unit 26. The output control unit 20E thus can provide the user with the result of position identification of the source wireless communication device 15.

The information processing executed by the position identifying device 10 will now be described.

Figure 4:
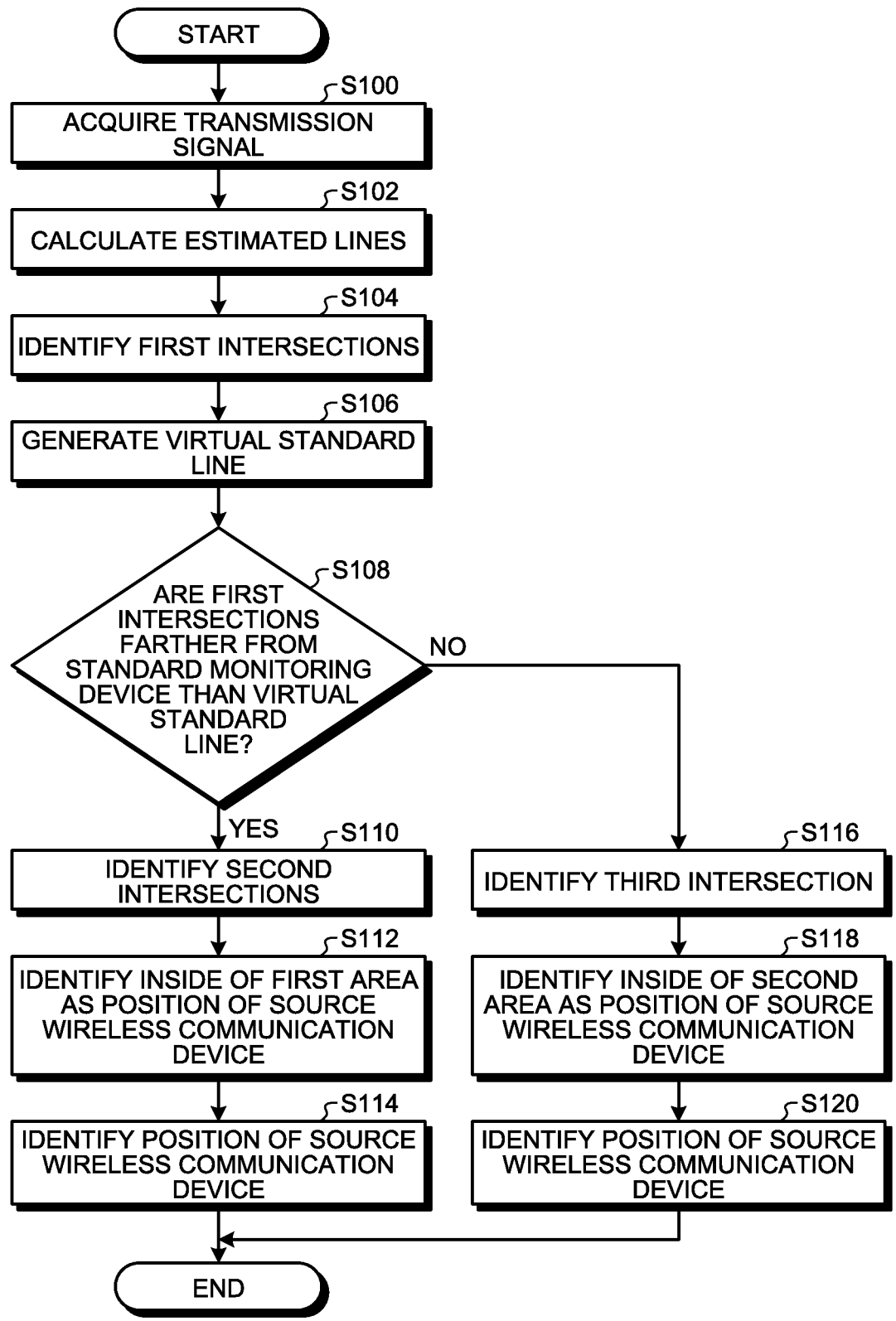
FIG. 4 is a flowchart illustrating information processing executed by a position identifying device according to the embodiment.

FIG. 4 is a flowchart illustrating an example of the information processing executed by the position identifying device 10.

First, the acquisition unit 20A acquires a transmission signal of the source wireless communication device 15 from each of the monitoring devices 12 (standard monitoring device 12A, reference monitoring device 12B, reference monitoring device 12C) (step S100).

The calculation unit 20B calculates the estimated lines 60, the base points of which are at the monitoring devices 12 and the radii of which are the estimated distances from the monitoring devices 12 to the wireless communication device 14, based on the transmission signals acquired at step S100 (step S102).

The determination unit 20C identifies the first intersections 70 (first intersection 70A, first intersection 70B) of the standard estimated line 60A, the base point of which is at the standard monitoring device 12A, with the reference estimated line 60B and the reference estimated line 60C, the base points of which are at the reference monitoring device 12B and the reference monitoring device 12C, respectively, from among the estimated lines 60 (step S104).

Next, the determination unit 20C generates a straight line connecting the reference monitoring device 12B with the reference monitoring device 12C, as the virtual standard line (step S106). The determination unit 20C can generate the virtual standard line 62 using the position information of the reference monitoring device 12B and the position information of the reference monitoring device 12C stored in advance.

Next, the determination unit 20C determines whether the first intersections 70 (first intersection 70A, first intersection 70B) identified at step S104 are farther from the standard monitoring device 12A than the virtual standard line 62 generated at step S106 (step S108).

When it is determined that the first intersections 70 are farther from the standard monitoring device 12A than the virtual standard line 62 (Yes at step S108), the process proceeds to step S110.

At step S110, the determination unit 20C identifies the second intersections 72 (step S110). In the example illustrated in FIG. 3, the determination unit 20C identifies the second intersection 72A of the virtual standard line 62 and the reference estimated line 60B and the second intersection 72B of the virtual standard line 62 and the reference estimated line 60C.

Then, the identifying unit 20D identifies the inside of the first area P1 inside the first intersections 70 (first intersection 70A and first intersection 70B) identified at step S104 and the second intersections 72 (second intersection 72A and second intersection 72B) identified at step S110, as the position of the source wireless communication device 15 (step S112).

Then, the identifying unit 20D identifies the centroid position of the first intersections 70 (first intersection 70A, first intersection 70B) and the second intersections 72 (second intersection 72A, second intersection 72B) in the first area P1 identified at step S112, as the position of the source wireless communication device 15 (step S114). This routine is then terminated.

At step S108, if it is determined that the first intersections 70 are closer to the standard monitoring device 12A than the virtual standard line 62 (No at step S108), the process proceeds to step S116. The negative determination may be made at step S108 also when the positions of the first intersections 70 are on the virtual standard line 62.

At step S116, the identifying unit 20D identifies the third intersection 74 (step S116). The identifying unit 20D identifies the intersection closer to the standard monitoring device 12A of the intersections of the reference estimated line 60B and the reference estimated line 60C, as the third intersection 74.

Then, the identifying unit 20D identifies the inside of the second area P2 inside the first intersections 70 (first intersection 70A, first intersection 70B) and the third intersection 74, as the position of the source wireless communication device 15 (step S118).

Then, the identifying unit 20D identifies the centroid position of the first intersection 70A, the first intersection 70B, and the third intersection 74 in the second area P2 as the position of the source wireless communication device 15 (step S120). This routine is then terminated.

An example of the information processing executed by each of the monitoring devices 12 will now be described.

Figure 5:
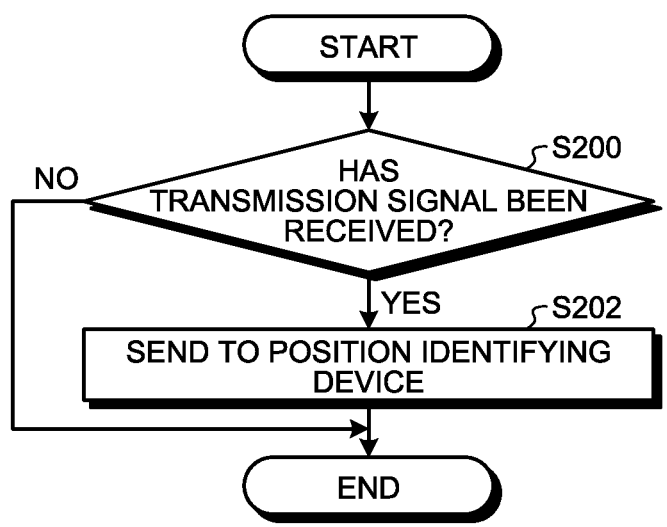
FIG. 5 is a flowchart illustrating information processing executed by a monitoring device according to the embodiment.

FIG. 5 is a flowchart illustrating an example of the information processing executed by the monitoring device 12.

The communication control unit 40A of the monitoring device 12 determines whether a transmission signal has been received from a wireless communication device 14 in the target area P (step S200). If a transmission signal has not been received (No at step S200), this routine is terminated. If it is determined that a transmission signal has been received (Yes at step S200), the process proceeds to step S202.

At step S202, the communication control unit 40A sends the received transmission signal to the position identifying device (step S202). In doing so, the communication control unit 40A sends the monitoring device ID of the monitoring device 12 and the position information of the monitoring device 12 together with the transmission signal to the position identifying device 10, as described above. This routine is then terminated.

As described above, the position identifying device 10 in the present embodiment includes the acquisition unit 20A, the calculation unit 20B, the determination unit 20C, and the identifying unit 20D.

The acquisition unit 20A acquires a transmission signal of a wireless communication device 14 in the target area P from each of the at least three or more monitoring devices 12 arranged around the target area P. The calculation unit 20B calculates the estimated lines 60, the base points of which are at the monitoring devices 12 and the radii of which are the estimated distances from the monitoring devices 12 to the wireless communication device 14, based on the transmission signal. The determination unit 20C determines whether the first intersections 70 (first intersection 70A, first intersection 70B) of the standard estimated line 60A that is the estimated line 60, the base point of which is at the standard monitoring device 12A that is one of the monitoring devices 12, and the reference estimated lines (reference estimated line 60B, reference estimated line 60C) that are the estimated lines 60, the base points of which are at the reference monitoring devices (reference monitoring device 12B, reference monitoring device 12C) that are the monitoring devices 12 other than the standard monitoring device 12A, are located farther from the standard monitoring device 12A than the virtual standard line 62 connecting the two reference monitoring devices (reference monitoring device 12B, reference monitoring device 12C).

When it is determined that the first intersections 70 (first intersection 70A, first intersection 70B) are located farther from the standard monitoring device 12A than the virtual standard line 62, the identifying unit 20D identifies the inside of the first area P1 inside the first intersections (first intersection 70A, first intersection 70B) and the second intersections 72 (second intersection 72A, second intersection 72B) of the virtual standard line 62 and reference estimated lines (reference estimated line 60B, reference estimated line 60C), as the position of the wireless communication device 14 (source wireless communication device 15).

Conventionally, the centroid of the intersections of estimated lines indicating the candidate positions of a wireless communication device is identified as the position of the wireless communication device. In this conventional method, however, as the distance of the position of the wireless communication device increases from a radio station serving as the standard for position identification (for example, the standard monitoring device 12A), the range indicated by the intersections of the estimated lines increases, and the position identifying accuracy decreases. In the conventional method, therefore, the accuracy in identifying the position of the wireless communication device may be reduced.

In the present embodiment, when it is determined that the first intersections 70 of the standard estimated line 60A with the reference estimated line 60B and the reference estimated line 60C are located farther from the standard monitoring device 12A than the virtual standard line 62 connecting the reference monitoring device 12B with the reference monitoring device 12C, the identifying unit 20D identifies the following area as the position of the source wireless communication device 15. Specifically, the identifying unit 20D identifies the inside of the first area P1 inside the first intersections 70 and the second intersections 72 of the virtual standard line 62 with each of the reference estimated line 60B and the reference estimated line 60C, as the position of the wireless communication device 14 that originates the transmission signal (that is, the source wireless communication device 15).

In the present embodiment, therefore, when the position of the wireless communication device 14 that originates the transmission signal is farther from the standard monitoring device 12A, the position identifying device 10 can identify the inside of the first area P1 as the position of the wireless communication device 14 (source wireless communication device 15), where the first area P is the inside of the first intersections 70 and the second intersections 72 of the reference estimated lines (reference estimated line 60B, reference estimated line 60C) and the virtual standard line 62 connecting the other two reference monitoring devices (reference monitoring device 12C, reference monitoring device 12D) and is a range considerably narrower than that in the conventional technique.

Accordingly, the position identifying device 10 in the present embodiment can improve the accuracy in identifying the position of the wireless communication device 14.

When it is determined that the first intersections 70 are located farther from the standard monitoring device 12A than the virtual standard line 62, the identifying unit 20D identifies the centroid position of the first intersections 70 and the second intersections 72 in the first area P1 as the position of the wireless communication device 14 that originates the transmission signal. In this way, the identifying unit 20D identifies the centroid position of the first intersections 70 and the second intersections 72 in the first area P1, which is an area in a range narrower than that in the conventional technique, as the position of the wireless communication device 14. Accordingly, the position identifying device 10 in the present embodiment can improve the accuracy in identifying the position of the wireless communication device 14.

In the present embodiment, the position identifying system 1 includes three monitoring devices 12 (standard monitoring device 12A, reference monitoring device 12B, reference monitoring device 12C). The acquisition unit 20A acquires the transmission signal from each of the three monitoring devices 12.

As described above, in the present embodiment, a straight line connecting the reference monitoring devices (reference monitoring device 12B, reference monitoring device 12C) that are two monitoring devices 12 other than the standard monitoring device 12A that is one of a plurality of the monitoring devices 12 is used as the virtual standard line 62. In the present embodiment, the position identifying device 10 acquires the transmission signal from each of the at least three monitoring devices 12 arranged around the target area P and thereby can accurately identify the position of the wireless communication device 14.

The position identifying device 10 in the present embodiment therefore can accurately identify the position of the wireless communication device 14 by acquiring the transmission signal from each of the three monitoring devices 12.

That is, the position identifying device 10 in the present embodiment can improve the accuracy in identifying the position of the wireless communication device 14 without increasing the number of monitoring devices 12.

In a case where four or more monitoring devices 12 are provided in the position identifying system 1, even when a transmission signal from the source wireless communication device 15 does not reach all of the monitoring devices 12, the position identifying device 10 in the present embodiment can accurately identify the position of the source wireless communication device 15 as long as the transmission signal reaches at least three monitoring devices 12.

The acquisition unit 20A acquires a transmission signal including hop count information indicating the number of hops taken until a wireless signal transmitted from the source wireless communication device 15 that is one of the wireless communication devices 14 in the target area P is received by each of the monitoring devices 12 via multi-hop wireless communication. The calculation unit 20B then calculates the estimated lines 60, the radii of which are the estimated distances calculated based on the hop count information included in the transmission signal and the distance between the wireless communication devices 14.

In this way, each estimated line 60 is calculated based on the hop count information included in the transmission signal and the distance between the wireless communication devices 14. In this configuration, compared with when the estimated line 60 is calculated by deriving the estimated distance using information other than hop count information, an accurate estimated line 60 can be calculated using the accurately calculated estimated distance. The position identifying device 10 in the present embodiment therefore can identify the position of the wireless communication device 14 even more accurately, in addition to the effect described above.

First Modification

In the foregoing embodiment, the determination unit 20C presets one of the monitoring devices 12 as the standard monitoring device, as an example. In the embodiment above, the determination unit 20C presets a monitoring device 12 other than the standard monitoring device of the monitoring devices 12, as a reference monitoring device.

However, the determination unit 20C may set a different monitoring device 12 as a standard monitoring device every time the position of the source wireless communication device 15 is identified or every predetermined timing.

In this way, the determination unit 20C may change the monitoring device 12 serving as the standard monitoring device.

Second Modification

In the foregoing embodiment, the position identifying system 1 includes three monitoring devices 12 (standard monitoring device 12A, reference monitoring device 12B, reference monitoring device 12C), as an example. However, as described above, the position identifying system 1 may have three or more monitoring devices 12. For example, the position identifying system 1 may have four or more monitoring devices 12.

Figure 6:
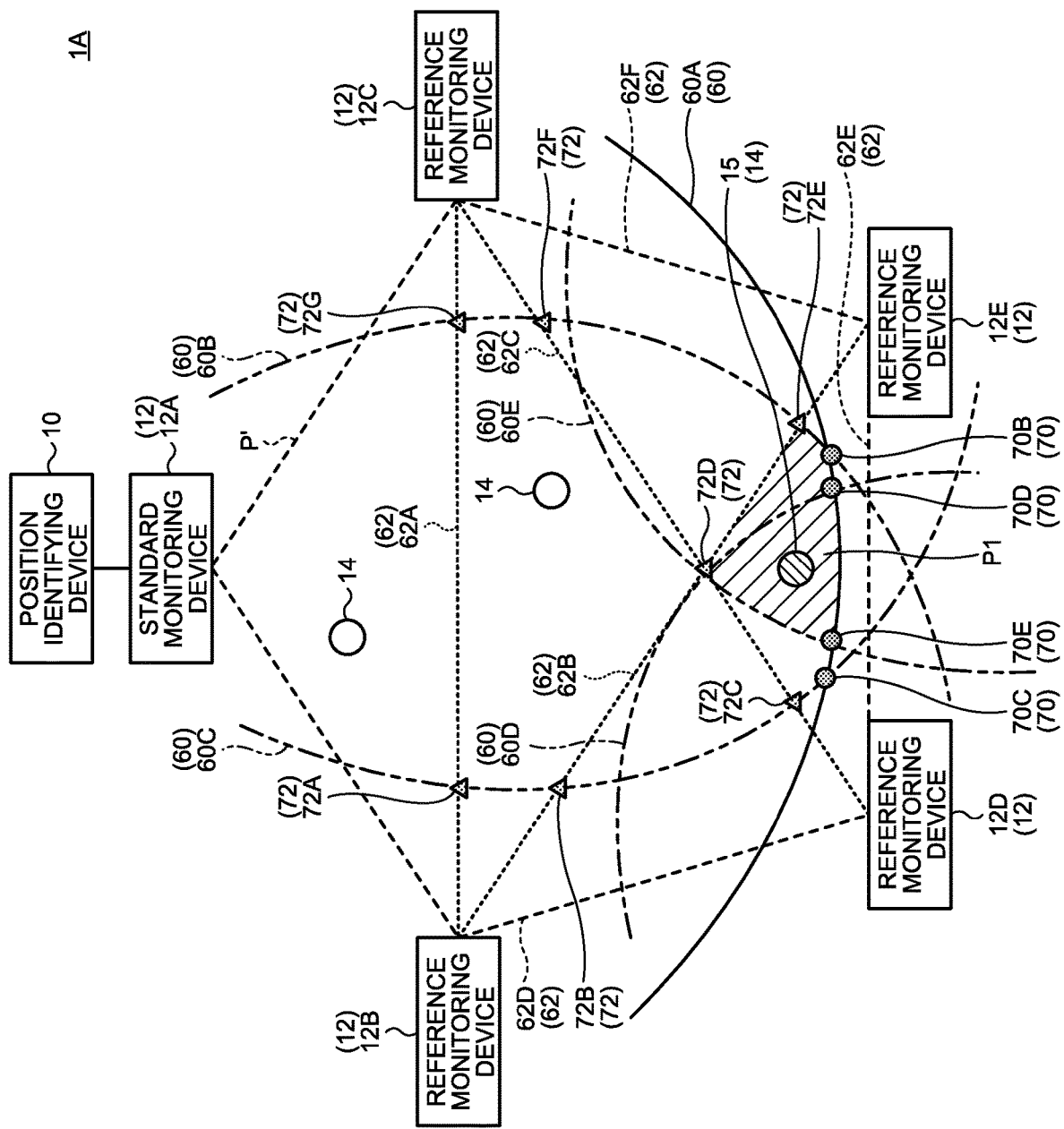
FIG. 6 is a diagram illustrating an example of a position identifying system according to a modification.

FIG. 6 is a diagram illustrating an example of a position identifying system 1A according to the present modification. The position identifying system 1A includes a position identifying device 10, five monitoring devices 12, and one or more wireless communication devices 14.

The position identifying device 10, the monitoring devices 12, and the wireless communication devices 14 are similar to the foregoing embodiment. The position identifying system 1A is similar to the foregoing embodiment except that it includes five monitoring devices 12.

The five monitoring devices 12 are arranged around a target area P' similarly to the foregoing embodiment and arranged to be able to wirelessly communicate with the wireless communication devices 14 in the target area P. The five monitoring devices 12 are arranged at different positions.

In the present modification, the position identifying system 1A includes a standard monitoring device 12A and four reference monitoring devices (reference monitoring device 12B, reference monitoring device 12C, reference monitoring device 12D, reference monitoring device 12E) as the five monitoring devices 12, as an example.

In the present modification, the control unit 20 of the position identifying device 10 can identify the position of the source wireless communication device 15 in the same manner as in the foregoing embodiment.

However, as illustrated in FIG. 6, when the position identifying system 1A includes four or more (five in the present modification) monitoring devices 12, the determination unit 20C generates a plurality of virtual standard lines 62.

Specifically, in this case, the determination unit 20C generates a virtual standard line 62A, a virtual standard line 62B, a virtual standard line 62C, a virtual standard line 62D, a virtual standard line 62E, and a virtual standard line 62F, as the virtual standard lines 62.

The virtual standard line 62A is a virtual standard line 62 connecting the reference monitoring device 12B with the reference monitoring device 12C. The virtual standard line 62B is a virtual standard line 62 connecting the reference monitoring device 12B with the reference monitoring device 12E. The virtual standard line 62C is a virtual standard line 62 connecting the reference monitoring device 12D with the reference monitoring device 12C. The virtual standard line 62D is a virtual standard line 62 connecting the reference monitoring device 12B with the reference monitoring device 12D. The virtual standard line 62E is a virtual standard line 62 connecting the reference monitoring device 12D with the reference monitoring device 12E. The virtual standard line 62F is a virtual standard line 62 connecting the reference monitoring device 12E with the reference monitoring device 12C.

The determination unit 20C can generate virtual standard lines 62 using the position information of the monitoring devices 12 received from the monitoring devices 12, in the same manner as in the foregoing embodiment.

When the acquisition unit 20A acquires the transmission signal of the source wireless communication device 15 from each of the five monitoring devices 12, the calculation unit 20B calculates a standard estimated line 60A that is the estimated line 60, the base point of which is at the standard monitoring device 12A, and reference estimated lines (reference estimated line 60B, reference estimated line 60C, reference estimated line 60D, reference estimated line 60E), the base points of which are at the reference monitoring devices that are the other monitoring devices 12 (reference monitoring device 12B, reference monitoring device 12C, reference monitoring device 12D, reference monitoring device 12E), in the same manner as in the foregoing embodiment.

The determination unit 20C then identifies a plurality of first intersections 70 (first intersection 70B, first intersection 70C, first intersection 70D, first intersection 70E) of the standard estimated line 60A with the reference estimated lines (reference estimated line 60B, reference estimated line 60C, reference estimated line 60D, reference estimated line 60E).

The determination unit 20C determines whether the identified first intersections 70 (first intersection 70B, first intersection 70C, first intersection 70D, first intersection 70E) are located farther from the standard monitoring device 12A than at least one of the virtual standard lines 62.

In the state illustrated in FIG. 6, the first intersections 70 (first intersection 70B, first intersection 70C, first intersection 70D, first intersection 70E) are located farther from the standard monitoring device 12A than the virtual standard line 62A, the virtual standard line 62B, and the virtual standard line 62C of a plurality of the virtual standard lines 62.

Then, when the determination unit 20C determines that the identified first intersections 70 (first intersection 70B, first intersection 70C, first intersection 70D, first intersection 70E) are located farther from the standard monitoring device 12A than at least one of the virtual standard lines 62, the identifying unit 20D executes the following process.

The identifying unit 20D identifies the inside of the first area P1 inside the first intersections 70 (first intersection 70B, first intersection 70C, first intersection 70D, first intersection 70E) and the second intersections 72 of the reference estimated lines with one virtual standard lines 62 used in the determination that the first intersections 70 are located farther from the standard monitoring device 12A, as the position of the wireless communication device 14.

Specifically, it is assumed that the determination unit 20C determines that the first intersections 70 (first intersection 70B, first intersection 70C, first intersection 70D, first intersection 70E) are located farther from the standard monitoring device 12A than the virtual standard line 62A, the virtual standard line 62B, and the virtual standard line 62C.

In this case, the identifying unit 20D identifies one virtual standard line 62 of the virtual standard lines 62 (in this case, virtual standard line 62A, virtual standard line 62B, virtual standard line 62C) used in the determination that the first intersections 70 are located farther. The identifying unit 20D can identify any one virtual standard line 62 of these virtual standard lines 62. Preferably, the identifying unit 20D identifies one virtual standard line 62 arranged at a position farthest from the standard monitoring device 12A from among these virtual standard lines 62.

In this case, for example, it is preferable that the identifying unit 20D identifies the virtual standard line 62B or the virtual standard line 62C from among the virtual standard lines 62 (in this case, virtual standard line 62A, virtual standard line 62B, virtual standard line 62C) by which it is determined that the first intersections 70 are located farther.

For example, it is assumed that the identifying unit 20D identifies one virtual standard line 62B out of the virtual standard line 62B and the virtual standard line 62C. In this case, the determination unit 20C identifies the inside of the first area P1 inside the first intersections 70 (first intersection 70B, first intersection 70C, first intersection 70D, first intersection 70E) and the second intersections 72 (second intersection 72B, second intersection 72C, second intersection 72D, second intersection 72E) of the virtual standard line 62B with the reference estimated lines (reference estimated line 60B, reference estimated line 60C, reference estimated line 60D, reference estimated line 60E), as the position of the wireless communication device 14 that originates the transmission signal.

Specifically, the identifying unit 20D identifies the first intersection 70B and the first intersection 70E that are intersections of the standard estimated line 60A with the reference estimated lines (reference estimated line 60B, reference estimated line 60E) of two reference monitoring device 12B and reference monitoring device 12E connected by the identified one virtual standard line 62B, from among the first intersection 70B, the first intersection 70C, the first intersection 70D, and the first intersection 70E.

The identifying unit 20D also identifies the second intersection 72D and the second intersection 72E that are intersections of the identified one virtual standard line 62B with the reference estimated lines (reference estimated line 60B, reference estimated line 60E) of two reference monitoring device 12B and reference monitoring device 12E connected by the virtual standard line 62B, from among the second intersections 72.

Then, the identifying unit 20D may identify the inside of the first area P1 inside the identified first intersection 70B, first intersection 70E, second intersection 72D, and second intersection 72E, as the position of the source wireless communication device 15 that is the wireless communication device 14 that originates the transmission signal.

Specifically, the identifying unit 20D may identify the centroid position of the identified first intersection 70B, first intersection 70E, second intersection 72D, and second intersection 72E in the first area P1, as the position of the source wireless communication device 15, in the same manner as in the foregoing embodiment.

In this way, in the present modification, the transmission signal is acquired from each of four or more monitoring devices 12. When the determination unit 20C determines that a plurality of first intersections 70 of the standard estimated line 60A with a plurality of reference estimated lines (reference estimated line 60B, reference estimated line 60C, reference estimated line 60D, reference estimated line 60E) are located farther from the standard monitoring device 12A than at least one of the virtual standard lines 62 each connecting two reference monitoring devices, the inside of the first area P1 inside the second intersections 72 of the one virtual standard line 62 (for example, virtual standard line 62B) used in the determination and the reference estimated lines, as the position of the wireless communication device 14.

Therefore, in the present modification, even in the case of four or more monitoring devices 12, the accuracy in identifying the position of the wireless communication device 14 can be improved.

When the transmission signal is acquired from each of the four or more monitoring devices 12, the position identifying device 10 may identify any three monitoring devices 12 and identify the position of the source wireless communication device 15 using the identified three monitoring devices 12, in the same manner as in the foregoing embodiment.

Hardware Configuration

Figure 7:
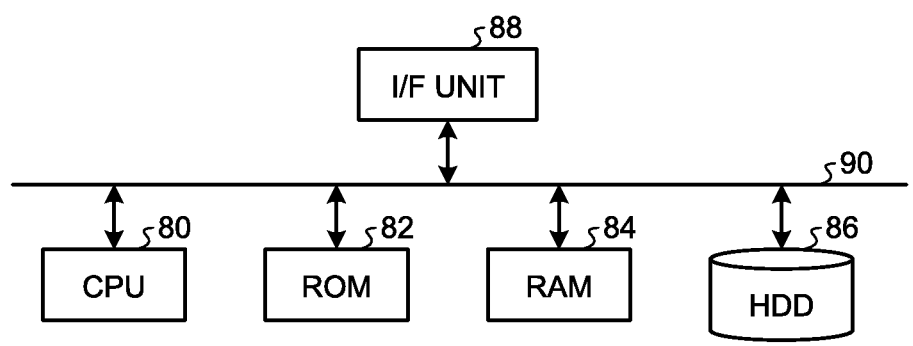
FIG. 7 is a hardware configuration diagram of the position identifying device, the monitoring device, and the wireless communication device according to the embodiment and the modification.

An exemplary hardware configuration of the position identifying device 10, the monitoring device 12, and the wireless communication device 14 in the foregoing embodiment will now be described. FIG. 7 is an exemplary hardware configuration diagram of the position identifying device 10, the monitoring device 12, and the wireless communication device 14.

The position identifying device 10, the monitoring device 12, and the wireless communication device 14 each include a control device such as a CPU 80, a storage device such as a read only memory (ROM) 82, a random access memory (RAM) 84, and a hard disk drive (HDD) 86, an interface (I/F) unit 88 for a variety of devices, and a bus 90 for connecting the units, and have a hardware configuration using a general computer.

In each of the position identifying device 10, the monitoring device 12, and the wireless communication device 14, the CPU 80 reads a computer program from the ROM 82 onto the RAM 84 and executes the computer program whereby the units are implemented on the computer.

The computer program for executing the processes executed in the position identifying device 10, the monitoring device 12, and the wireless communication device 14 may be stored in the HDD 86. The computer program for executing the processes executed in the position identifying device 10, the monitoring device 12, and the wireless communication device 14 may be built in the ROM 82 in advance.

The computer program for executing the processes executed in the position identifying device 10, the monitoring device 12, and the wireless communication device 14 may be stored in a computer-readable recording medium such as a CD-ROM, a CD-R, a memory card, a digital versatile disc (DVD), and a flexible disk (FD) in an installable or executable file format and provided as a computer program product. The computer program for executing the processes executed in the position identifying device 10, the monitoring device 12, and the wireless communication device 14 may be stored on a computer connected to a network such as the Internet and downloaded via the network. The computer program for executing the processes executed in the position identifying device 10, the monitoring device 12, and the wireless communication device 14 may be provided or distributed via a network such as the Internet.

An embodiment of the present invention can improve the accuracy in identifying the position of a wireless communication device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A position identifying device comprising:
processing circuitry that:
   acquires a transmission signal of a wireless communication device in a target area from each of at least three or more monitoring devices disposed around the target area,
   calculates a plurality of estimated lines with base points at the monitoring devices and with radii equal to estimated distances from the monitoring devices to the wireless communication device, based on the transmission signal, determines whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device, the virtual standard line connecting two of the reference monitoring devices, and when it is determined that the first intersections are located farther from the standard monitoring device than the virtual standard line, identifies, as a position of the wireless communication device, an inside of a first area inside the first intersections and second intersections of the virtual standard line and the reference estimated lines.

2. The position identifying device according to claim 1, wherein when it is determined that the first intersections are located farther from the standard monitoring device than the virtual standard line, the processing circuitry identifies a centroid position of the first intersections and the second intersections in the first area as the position of the wireless communication device.

3. The position identifying device according claim 1, wherein the monitoring devices include three monitoring devices, and the processing circuitry acquires the transmission signal from each of the three monitoring devices.

4. The position identifying device according to claim 2, wherein the monitoring devices include four or more monitoring devices, the virtual standard line includes a plurality of virtual standard lines each connecting two of the reference monitoring devices, the processing circuitry further:

acquires the transmission signal from each of the four or more monitoring devices, determines whether the first intersections of the standard estimated line and the reference estimated lines are located farther from the standard monitoring device than at least one of the plurality of virtual standard lines, and when it is determined that the first intersections are located farther from the standard monitoring device than the at least one of the virtual standard lines, identifies, as the position of the wireless communication device, the inside of the first area inside the first intersections and second intersections of one of the virtual standard lines used in determination and the reference estimated lines.

5. The position identifying device according to claim 1, wherein the processing circuitry further:

acquires the transmission signal including hop count information indicating number of hops until a wireless signal transmitted from the wireless communication device is received by each of the monitoring devices via multi-hop wireless communication, and calculates the estimated lines with radii equal to the estimated distances calculated based on the hop count information included in the transmission signal and a distance between a plurality of wireless communication devices in the target area.

6. A position identifying system comprising:

a position identifying device; and a plurality of monitoring devices that communicates with the position identifying device, wherein the position identifying device comprises processing circuitry that:

acquires a transmission signal of a wireless communication device in a target area from each of at least three or more of the monitoring devices disposed around the target area, calculates a plurality of estimated lines with base points at the monitoring devices and with radii equal to estimated distances from the monitoring devices to the wireless communication device, based on the transmission signal, determines whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device, the virtual standard line connecting two of the reference monitoring devices, and when it is determined that the first intersections are located farther from the standard monitoring device than the virtual standard line, identifies, as a position of the wireless communication device, an inside of a first area inside the first intersections and second intersections of the virtual standard line and the reference estimated lines.

7. A computer program product including programmed instructions embodied in and stored on a non-transitory computer readable medium, wherein the instructions are executed by a computer and cause the computer to execute:

acquiring a transmission signal of a wireless communication device in a target area from each of at least three or more monitoring devices disposed around the target area;

calculating a plurality of estimated lines with base points at the monitoring devices and with radii equal to estimated distances from the monitoring devices to the wireless communication device, based on the transmission signal;

determining whether first intersections of a standard estimated line and reference estimated lines are located farther from a standard monitoring device than a virtual standard line, the standard monitoring device being one of the monitoring devices, the standard estimated line being one of the estimated lines with a base point at the standard monitoring device, the reference estimated lines being estimated lines with base points at a plurality of reference monitoring devices that are monitoring devices other than the standard monitoring device, the virtual standard line connecting two of the reference monitoring devices; and when it is determined that the first intersections are located farther from the standard monitoring device than the virtual standard line, identifying, as a position of the wireless communication device, an inside of a first area inside the first intersections and second intersections of the virtual standard line and the reference estimated lines.

\* \* \* \* \*